United States Patent Office 2,983,696
Patented May 9, 1961

2,983,696
POLYMERIC COMPOSITIONS AND THEIR METHOD OF MANUFACTURE

Stanley Tocker, Wilmington, Del., assignor to E. I. du Pont de Nemours and Company, Wilmington, Del., a corporation of Delaware No Drawing. Filed Jan. 7, 1959, Ser. No. 785,318

22 Claims. (Cl. 260—23)

This invention relates to the preparation of new polymeric products, particularly shaped structures and coatings of polymers obtained from aliphatic 1-olefins with vinyl esters.

One object is to provide a novel process for preparing aliphatic 1-olefin/vinyl ester polymeric compositions. Another object is to provide novel three-component polymers, terpolymers. A further object is to provide fibers and films and other shaped structures of these polymers. Other objects will appear hereinafter.

In its broadest terms, the present invention involves hydrolyzing, either partially or completely, a polymer obtained from an aliphatic 1-olefin such as ethylene and a low vinyl ester of a monocarboxylic acid such as vinyl formate, vinyl acetate, vinyl propionate, and the like; then re-esterifying, usually with an esterifying agent of a substantially higher molecular weight ester group; and thereafter, if desired, convert the polymer into films, fibers or the like.

This method provides a novel route to otherwise difficult to obtain aliphatic 1-olefin/vinyl ester copolymers such as ethylene/vinyl salicylate, ethylene/vinyl laurate, etc. But even more important, this method provides a route to substantially linear terpolymers of aliphatic 1-olefin/low vinyl ester/high vinyl ester, the undesirable branching being virtually eliminated by the process of the present invention.

Preferably, the invention comprises copolymerizing $n$ moles, $n$ being an integer, of a vinyl ester having the structural formula

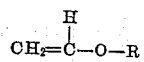

wherein R is an acyl radical derived from an organic monocarboxylic acid, said acyl radical having $x$ carbon atoms, $x$ being an integer having a value of at least one, preferably 1–7, with at least $2n$ moles of an aliphatic 1-olefin, preferably ethylene; hydrolyzing the resulting copolymer to remove $y$ ester groups, $y$ being an integer having a value of from $n/20$ to $n$, preferably no more than $2n/3$; and esterifying the hydrolyzed product with $y$ esterifying groups selected from the group consisting of acyl radicals derived from organic monocarboxylic acids having at least $(x+1)$ carbon atoms (preferably 11–24 carbon atoms) and acyl radicals of the formula

wherein R' is hydroxy-aryl.

The resulting terpolymers tend to be inherently permanently plasticized. Plasticization is attributed to the higher molecular weight, particularly of the long chain ester groups added in the final esterification step. The prior art necessity of incorporating plasticizing additives to ethylene/vinyl ester polymers to provide flexibility, ease of fabrication, etc. is obviated by the terpolymers of the present invention. Furthermore, these internally plasticized terpolymers are amenable to reenforcing treatments as disclosed hereinafter. The substitution of hydroxy-aryl containing acyl groups such as the salicyl group for a portion of the low molecular weight acyl groups tends to add the property of light stability to the improved characteristics of the ethylene/vinyl ester terpolymer.

The invention will be described for use in the production of self-supporting films and sheets for wrapping purposes and the like. However, it should be understood that the invention is applicable to the preparation of shaped structures of all types and to the preparation of coatings. Thus, it is contemplated that the polymeric compositions of the present invention will find use as filaments, films, rods, tubes, laminates, adhesive and non-adhesive coatings, etc.

The process of the invention involves a combination of three steps, each of which is absolutely essential in achieving the final result. In the following sections of the specification, each of the three steps, copolymerization, hydrolysis and re-esterification, are discussed separately.

COPOLYMERIZATION

In the first step of the process an aliphatic 1-olefin such as ethylene, propylene, butene-1, isobutylene, pentene-1 and hexene-1 is copolymerized with a vinyl ester derived from a low saturated fatty acid. The vinyl ester is preferably vinyl acetate or vinyl formate but obviously any available relatively low molecular weight vinyl ester, preferably no higher than vinyl enanthate, may be used.

Copolymerization may be performed by any method known to the art. For example, to prepare an ethylene/vinyl acetate copolymer, ethylene may be reacted under pressure in an emulsion process with vinyl acetate in the presence of a reduction-oxidation catalyst. The resulting copolymer, in the form of a latex, may be coagulated with a brine solution; the brine is removed by washing with water and the copolymer is then dried. Such a process is disclosed more fully in U.S. Patent 2,703,794 to M. J. Roedel. The process involves essentially polymerizing the aliphatic 1-olefin and the vinyl ester in the presence of a reducing agent and an oxidizing agent, the agents being capable of generating a free radical by a reduction-oxidation reaction.

The preferred ratio of the aliphatic 1-olefin (ethylene) to the vinyl ester (vinyl acetate) is at least 2 to 1 but may be as high as 50 to 1 and as low as 1 to 5. The degree of polymerization in the copolymer should be at least 100 as defined by Staudinger in "Die Hoch Molekularen Organischen Verbindungen" (1932).

HYDROLYSIS

The term hydrolysis is intended to include alcoholysis as well as hydrolysis with water. This step is preferably carried out by dissolving the copolymer in a primary alcohol which is liquid at 25° C. or in an alcohol-toluene solvent mixture composed of at least 25% by weight of the alcohol or in an aromatic hydrocarbon solvent such as toluene and then treating with a suitable hydrolyzing agent or catalyst.

The most suitable alcohols are methyl alcohol and ethyl alcohol, but higher alcohols such as propyl, butyl and isobutyl alcohol may also be used to advantage. In cases where the olefin/vinyl ester copolymer is not sufficiently soluble in the alcohol, a mixed solvent or an aromatic hydrocarbon solvent may be used to improve solubility. Thus, the alcohol may be used in a mixture with benzene, toluene, xylene, pyridine, dioxane, trichloroethylene, cyclohexane, n-heptane or the like. In some cases, hydrolysis may be carried out in solvent systems containing water; for example, water with acetic acid or with dioxane or with ethanol or with methanol or other water-miscible solvents.

The hydrolyzing catalyst is preferably an alkali catalyst that operates either by straight saponification or as an ester-interchange or alcoholysis catalyst. Sodium hydroxide is available, cheap and, therefore, preferred. However, other alkaline materials such as the hydroxides of potassium, lithium, rubidium, calcium, strontium, barium may also be used. In some instances, not preferred but where a slower rate of hydrolysis is desired, an acid catalyst such as sulfuric acid, phosphoric acid, p-toluenesulfonic acid, hydrochloric acid and the like may be used.

With the alkali catalyst the reaction is usually carried out at an elevated temperature, i.e., at the boiling point of the solvent, and is complete in less than one hour. The extent of hydrolysis is controlled by the amount of alkali catalyst employed.

The result of the hydrolysis step may be a completely hydrolyzed product or a partially hydrolyzed product. The completely hydrolyzed products will obviously be the same regardless of the vinyl ester in the original copolymer. The partially hydrolyzed products will contain in the polymer chains CH(OH) groups as well as CHOR groups (where R is an acyl radical of a monocarboxylic organic acid) and methylene groups. However, in the preferred hydrolysis product more than half of the groups will be methylene groups and the ratio of CHOR groups to CH(OH) groups will range from 1.2 to 20:1.

ESTERIFICATION

The purpose of the esterification step is to convert the CH(OH) groups to CHOR'' groups wherein R'' is either an acyl radical of a long chain monocarboxylic acid (having more carbon atoms than the R radical), preferably a fatty acid having at least 11 carbon atoms, or an acyl radical of a hydroxy-aryl acid.

After isolating the completely or partially hydrolyzed ethylene/vinyl ester, the esterification agent is added to the polymer, the polymer being in an organic solvent such as toluene, benzene, xylene, pyridine, dioxane, trichloroethylene, cyclohexane, n-heptane, etc. Isolation is most easily accomplished by azeotropic distillation of the excess alcohol-water added by the previous hydrolysis step. This distillation leaves the polymer in the desired solvent. However, if desired, the polymer may be filtered and washed and new solvent added prior to the addition of the esterification agent.

The esterification agents which may be the halides, anhydrides, or the acids themselves containing the R'' acyl radical are added to the hydrolyzed product in the solvent usually under anhydrous conditions. The mixture is then refluxed for a period which may be from 30 minutes to 24 hours or more. The re-esterified product is then filtered and washed with alcohol to remove excess esterification agent.

Among the esterifying agents which may be used are acetyl chloride, propionyl chloride, n-butyral chloride, n-valeryl chloride, isovaleryl chloride, n-caproyl chloride, n-caprylyl chloride, n-capryl chloride, n-lauroyl chloride, n-myristoyl chloride, n-palmityl chloride, n-stearyl chloride, or the bromides and iodides of these compounds, n-caproic anhydrides, n-caprylic anhydride, n-capryl anhydride, n-lauric anhydride, n-myristic anhydride, n-palmitic anhydride, n-stearic anhydride, salicylyl chloride, salicyclic acid, meta- or para-hydroxy benzoic acid. When re-esterifying with higher aliphatic carboxylic radicals, a practical upper limit of chain length is an aliphatic carboxylic acid of about 24 carbon atoms.

The resulting copolymers or terpolymers may be used directly in the formation of film, fibers and the like by processes well known to those skilled in the art. The polymers can be molded into objects, extruded as tubing, filaments, films, rods, etc. and melt cast or cast from suitable solvents to provide thin films and the like. Solutions of the polymers may be coated on paper, fabrics, or on films of other polymeric materials such as regenerated cellulose films to impart desirable properties to the thus coated base films.

The polymers may also be modified prior to or subsequent to shaping. The modifying agents may be selected from a variety of types such as pigments, waxes, inorganic and organic fillers, etc. One particularly desirable modification involves reaction with siliceous particles as described in U.S. patent application Serial No. 602,398 to Richard D. Pruett, filed August 6, 1956. The result of such modification with siliceous particles in the manner disclosed by the aforementioned patent application is to increase the tear strength and tenacity of the polymer, while avoiding the increase in stiffness or tensile modulus that is obtained when the ethylene/low molecular weight vinyl ester copolymers are similarly modified.

The invention will be more clearly understood by referring to the following examples, Example I representing the best mode contemplated for performing the invention. These examples, illustrating specific embodiments of the present invention, should not be considered limitative.

Example I

An ethylene/vinyl acetate copolymer (4/1 mole ratio) was prepared by adding the following to a one-liter stainless steel rocker tube under a stream of nitrogen: a solution of 3 grams $Na_2HPO_4$ and 10 grams of Duponol ME [1] in 280 mls. of deoxygenated water, a solution of 0.14 gram of $FeSO_4 \cdot 7H_2O$ and 0.23 gram of $Na_4P_2O_7 \cdot 10H_2O$, 0.54 gram of $K_2S_2O_8$, 0.21 gram of $NaHSO_3$ and 100 mls. of vinyl acetate. The rocker tube was evacuated and pressured to 400 atmospheres with ethylene containing less than 10 parts per million of oxygen. The rocker was started and the temperature brought to 30° C. for a 2 hour reaction period. At the end of this time the rocker contents were discharged in the form of a latex, the latex was coagulated with brine, washed with water and dried. A yield of 40 grams of copolymer was obtained. Infrared analysis showed the copolymer to contain approximately 4 moles of combined ethylene per mole of combined vinyl acetate.

Twenty grams of the copolymer was dissolved in 200 mls. of toluene with stirring. A solution of 0.4 gram of sodium hydroxide in 20 mls. of methanol and 2 mls. of water was added drop-wise to the copolymer solution. The excess methanol and water was then azeotropically distilled from the solution until the temperature of the vapors reached 110° C.

Fifteen grams of n-stearyl chloride was then added to the toluene solution of the partially hydrolyzed polymer in the reaction flask. The mixture was then refluxed at a temperature of 110° C. for two hours. The resulting product weighing 21 grams was precipitated, filtered and washed with methanol. By infrared absorption analysis, it was determined that the product was a terpolymer of ethylene/vinyl acetate/vinyl stearate (80/18/2 mole ratio).

The polymer was pressed into a film by pressing in a Carver press at 110° C. for one minute at 30 tons pressure. The resulting film, .005" thick, was flexible and displayed substantially no tackiness, even after aging for 90 days.

Example II

An ethylene/vinyl acetate copolymer (4/1 mole ratio) was prepared in the manner described in Example I. Fifty grams of the copolymer was dissolved in 340 mls. of boiling toluene. After the solution was cooled to about 50° C., 1.1 grams of sodium hydroxide dissolved in 40 mls. of a 98% methanol/2% water mixture was added slowly. After stirring for 30 minutes while maintaining the temperature of the mixture at 65° C., excess methanol and water was azeotropically distilled from the solution until the temperature of the vapors reached 110° C. The

[1] The sodium salt of sulfated lauryl alcohol, manufactured by E. I. du Pont de Nemours & Co.

resultant slurry was poured into a suction funnel, washed with warm water to remove all soluble salts, then dried in a vacuum oven at 50° C. The product was 48 grams of a white powder, the partially hydrolyzed ethylene/vinyl acetate polymer.

Twenty-four grams of the hydrolyzed polymer was then esterified by first adding 200 mls. of toluene and then 11 grams of n-lauroyl chloride followed by refluxing at a temperature of 110° C. for two hours. The resulting product weighing 24 grams was precipitated, filtered and washed with methanol. By infrared absorption analysis, it was determined that the product was a terpolymer of ethylene/vinyl acetate/vinyl lauroate (80/18/2 mole ratio).

The polymer was pressed into a satisfactory flexible film by pressing in a Carver press at 30 tons pressure for one minute at 110° C.

*Example III*

The procedure of Example I was again repeated using 20 grams of the ethylene/vinyl acetate copolymer (4/1 mole ratio) dissolved in 200 mls. of toluene. A solution of 0.4 gram of sodium hydroxide in 20 mls. of methanol and 2 mls. of water was added drop-wise to the copolymer solution.

After azeotropically distilling the excess methanol and water, 3 grams of n-caproyl chloride was added to the solution of the partially hydrolyzed polymer. The mixture was refluxed under anhydrous conditions, heating at 110° C. with stirring continuing for two hours. The product was isolated by precipitating and washing with methanol. By infrared absorption analysis, it was determined that the product was a terpolymer of ethylene/vinyl acetate/vinyl caproate (80/18/2 mole ratio).

The polymer exhibited adhesive properties adaptable for use in a pressure-sensitive adhesive.

*Example IV*

The procedure of Example I was again repeated using 20 grams of the ethylene/vinyl acetate copolymer (4/1 mole ratio) dissolved in 200 mls. of toluene. A solution of 0.4 gram of sodium hydroxide in 20 mls. of methanol and 4 mls. of water was added drop-wise to the copolymer solution.

After azeotropically distilling the excess methanol and water, 3 grams of salicylic acid and 0.2 gram of p-toluene-sulfonic acid were added to the solution of the partially hydrolyzed polymer. The mixture was refluxed for 24 hours under a blanket of nitrogen at a temperature of 110° C. using a Dean-Stark water separator trap. The product was isolated by precipitating and washing with methanol. By infrared absorption analysis, it was determined that the product was a terpolymer of ethylene/vinyl acetate/vinyl salicylate (80/18/2 mole ratio).

The polymer was formed into a satisfactory film by the procedure described in Example I.

*Example V*

The procedure of Example II was repeated to prepare 24 grams of the partially hydrolyzed ethylene/vinyl acetate copolymer in 250 mls. of toluene.

The polymer solution was treated with 5 grams of propionyl chloride and heated at 70° C. with stirring for three hours. The product weighing 23.8 grams was isolated by precipitating and washing with methanol. By infrared absorption analysis, it was determined that a terpolymer had been obtained, a terpolymer of ethylene/vinyl acetate/vinyl propionate (80/18/2 mole ratio).

The resulting terpolymer was milled with 8.0 grams of "Cab-O-Sil"[1] siliceous particles in a rubber mill at 120°–130° C. for 15 minutes and was then pressed into a film in a Carver press heated at 120° C. for one minute at 30 tons pressure. The resulting modified polymeric film had a low tensile modulus, an increased tear strength while the satisfactory tenacity level of the unmodified terpolymer product had been retained.

*Example VI*

A 14/1 mole ratio ethylene/vinyl acetate copolymer was prepared by adding the following to a one liter stainless steel rocker tube at 0° C. under a stream of nitrogen: a solution of 220 mls. of deoxygenated water containing 10 grams "Duponol" ME, 20 mls. of deoxygenated water containing 0.14 gram of $FeSO_4 \cdot 7H_2O$ and 0.23 gram of $Na_4P_2O_7 \cdot 10H_2O$, 60 mils. deoxidized tertiary butyl alcohol, 0.31 gram of 1-ascorbic acid, 0.26 gram of cyclohexanone peroxide and 50 mls. of vinyl acetate. The rocker tube was then evacuated and pressured to 400 atmospheres with ethylene. The rocker was started, the temperature was brought to 30° C. and the pressure to 1000 atmospheres for a two hour period. There was obtained 40 grams of copolymer.

Fifteen grams of the copolymer was dissolved in 150 mls. of boiling toluene. After the copolymer solution was cooled to about 50° C., 1.24 grams of sodium hydroxide dissolved in 25 mls. of a 98% methanol/2% water mixture was added slowly with stirring. After stirring for 30 minutes while maintaining the temperature of the mixture at 65° C., excess methanol and water was azeotropically distilled from the solution until the temperature of the vapors reached 110° C. The resultant slurry was poured into a suction funnel, washed with warm water to remove all soluble salts, then dried in a vacuum oven at 50° C.

Twelve grams of the completely hydrolyzed polymer was then dissolved in 150 mls. of toluene. About ten grams of salicylyl chloride was then added slowly to the solution and the mixture was refluxed at a temperature of 110° C. for 1½ hours. The resulting product was precipitated, filtered and washed with methanol. By infrared absorption analysis, it was determined that a substantially quantitative yield of the copolymer of ethylene/vinyl salicylate (14/1 mole ratio) had been obtained.

A portion of the polymer was then pressed into a film by heating in a Carver press at 110° C. for one minute under 30 tons presure. The film displayed improved stability toward the degrading effect of light as shown by the following test: Strips of the film were attached to a frame and then exposed to the light of four 20-watt fluorescent sun lamps (Westinghouse No. FS20T12) in a box, the distance of the strips from the lamps being 2½". A reflector was provided behind each lamp. Each strip was manually tested for tear-resistance and flexibility. The ethylene/vinyl salicylate film of this example remained flexible and retained good tear strength at 750 hours whereas a polyethylene control film had badly impaired tear strength and reduced flexibility at 300 hours.

Having fully disclosed the invention, what is claimed is:

1. A process which comprises the steps in sequence of copolymerizing a vinyl ester having the structural formula

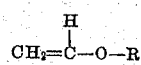

wherein R is an acyl radical derived from an organic monocarboxylic acid, said acyl radical having $x$ carbon atoms, $x$ being an integer having a value of at least 1, with an aliphatic 1-olefin to form a vinyl ester/aliphatic 1-olefin copolymer; hydrolyzing said copolymer to replace $y$ ester groups with $y$ hydroxyl groups, $y$ being an integer; and re-esterifying the hydrolyzed product with $y$ ester groups selected from the group consisting of acyl radicals derived from organic monocarboxylic acids, said ---
[1] Product manufactured by Godfrey L. Cabot, Inc.

acyl radicals having at least x+1 carbon atoms and acyl radicals of the formula

wherein R' is hydroxyl-aryl.

2. A process which comprises the steps in sequence of copolymerizing n moles of a vinyl ester having the structural formula

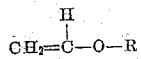

wherein R is an acyl radical derived from an organic monocarboxylic acid, said acyl radical having x carbon atoms, x being an integer having a value of at least 1, with at least 2n moles of an aliphatic 1-olefin to form a vinyl ester/aliphatic 1-olefin copolymer; hydrolyzing said copolymer to replace y ester groups with y hydroxyl groups, y being an integer from n/20 to n; and re-esterifying the hydrolyzed product with y ester groups selected from the group consisting of acyl radicals derived from organic monocarboxylic acids, said acyl radicals having at least x+1 carbon atoms and acyl radicals of the formula

wherein R' is hydroxy-aryl.

3. A process which comprises the steps in sequence of copolymerizing n moles of a vinyl ester having the structural formula

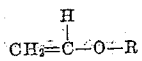

wherein R is an acyl radical derived from an organic monocarboxylic acid, said acyl radical having x carbon atoms, x being an integer having a value of a least 1, with at least 2n moles of an aliphatic 1-olefin to form a vinyl ester/aliphatic 1-olefin copolymer; hydrolyzing said copolymer to replace y ester groups with y hydroxyl groups, y being an integer from n/20 to 2n/3; and reesterifying the hydrolyzed product with y ester groups selected from the group consisting of acyl radicals derived from organic monocarboxylic acids, said acyl radicals having at least x+1 carbon atoms and acyl radicals of the formula

wherein R' is hydroxy-aryl.

4. A process which comprises the steps in sequence of copolymerizing n moles of a vinyl ester having the structural formula

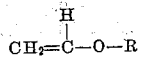

wherein R is an acyl radical derived from an organic monocarboxylic acid, said acyl radical having 1-7 carbon atoms with at least 2n moles of an aliphatic 1-olefin to form a vinyl ester/aliphatic 1-olefin copolymer; hydrolyzing said copolymer to replace y ester groups with y hydroxyl groups, y being an integer from n/20 to n; and reesterifying the hydrolyzed product with y ester groups selected from the group consisting of acyl radicals derived from fatty acids, said acyl radicals having at least 11-24 carbon atoms and acyl radicals of the formula

wherein R' is hydroxy-aryl.

5. A process as in claim 1 wherein said aliphatic 1-olefin is ethylene.

6. A process as in claim 1 wherein said vinyl ester in the copolymerizing step is vinyl acetate.

7. A process which comprises the steps in sequence of copolymerizing n moles of a vinyl ester having the structural formula

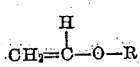

wherein R is an acyl radical derived from an organic monocarboxylic acid, said acyl radical having x carbon atoms, x being an integer having a value of at least 1, with at least 2n moles of an aliphatic 1-olefin; dissolving the copolymer in a suitable solvent containing at least 25% of a primary alcohol; adding an alkali catalyst to the solution and heating to replace y ester groups with y hydroxyl groups, y being an integer from n/20 to n; isolating the hydrolyzed product; adding an esterifying agent selected from the group consisting of halides, anhydrides and acids containing an acyl radical, said acyl radical being derived from acids selected from the group consisting of fatty acids having x+1 carbon atoms and hydroxy-aryl acids to replace the y hydroxyl groups.

8. A process which comprises the steps in sequence of copolymerizing ethylene and vinyl acetate to form a copolymer in which the mole ratio of ethylene to vinyl acetate is at least 2 to 1; dissolving said polymer in toluene; adding a solution of sodium hydroxide in methanol and water, the methanol comprising 85–95% of the mixture of methanol and water; and heating to replace from ½₀ to all of the acetate groups with hydroxyl groups; isolating the hydrolyzed product; adding an acyl chloride, the acyl radical being derived from acids selected from the group consisting of fatty acids having 11–24 carbon atoms and salicylic acid, and heating to a temperature of 60°–110° C.

9. A substantially linear terpolymer of an aliphatic 1-olefin; a vinyl ester having the structural formula

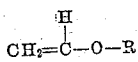

wherein R is an acyl radical derived from an organic monocarboxylic acid, said acid having x carbon atoms, x being an integer having a value of at least 1; and a vinyl ester having the structural formula

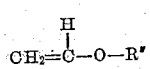

wherein R" is an acyl radical selected from the group consisting of acyl radicals derived from fatty acids having x+1 carbon atoms and acyl radicals derived from a hydroxy-aryl acid, said terpolymer made by the process of claim 1.

10. A substantially linear terploymer of ethylene, vinyl acetate and a vinyl ester of a monocarboxylic acid selected from the group consisting of fatty acids having 11–24 carbon atoms and salicylic acid made by the process of claim 4.

11. A substantially linear terpolymer of ethylene, vinyl acetate and vinyl stearate made by the process of claim 4.

12. A substantially linear terpolymer of ethylene, vinyl acetate and vinyl caproate made by the process of claim 4.

13. A substantially linear terpolymer of ethylene, vinyl acetate and vinyl salicylate made by the process of claim 4.

14. A substantially linear terpolymer of ethylene, vinyl acetate and vinyl propionate made by the process of claim 4.

15. A shaped structure comprising the terpolymer of claim 9.

16. A shaped structure comprising the terpolymer of claim 10.

17. A self-supporting film comprising the terpolymer of claim 9.

18. A self-supporting film comprising the terpolymer of claim 10.

19. A plasticized composition comprising the terpolymer of claim 9.

20. A plasticized composition comprising the terpolymer of claim 10.

21. A polymer prepared by the process of claim 2 having the formula $(C_2H_4)_{\text{at least } 2n}(C_2H_3OR)_{n-(n/20 \text{ to } n)}(C_2H_3OR'')_{n/20 \text{ to } n}$ wherein $n$ is an integer;

R is an acyl radical derived from an organic monocarboxylic saturated acid having 1–7 carbon atoms; and R'' is an acyl radical selected from the group consisting of acyl radicals derived from organic monocarboxylic saturated acids having 11–24 carbon atoms and acyl radicals derived from hydroxy-aryl acids.

22. A polymer prepared by the process of claim 3 having the formula $(C_2H_4)_{\text{at least } 2n}(C_2H_3OR)_{n-(n/20 \text{ to } 2n/3)}$
$(C_2H_3OR'')_{n/20 \text{ to } 2n/3}$ wherein $n$ is an integer;

R is an acyl radical derived from an organic monocarboxylic saturated acid having 1–7 carbon atoms; and R'' is an acyl radical selected from the group consisting of acyl radicals derived from organic monocarboxylic saturated acids having 11–24 carbon atoms and acyl radicals derived from hydroxy-aryl acids.

References Cited in the file of this patent

UNITED STATES PATENTS

| | | |
|---|---|---|
| 2,668,809 | Bryant et al. | Feb. 9, 1954 |
| 2,703,794 | Roedel | Mar. 8, 1955 |